United States Patent
Hiatt

(10) Patent No.: US 9,243,979 B2
(45) Date of Patent: Jan. 26, 2016

(54) SYSTEM AND METHOD FOR ADJUSTMENT RESPONSE ANALYSIS

(71) Applicant: SIMMONDS PRECISION PRODUCTS, INC., Vergennes, VT (US)

(72) Inventor: Daniel Hiatt, S. Burlington, VT (US)

(73) Assignee: SIMMONDS PRECISION PRODUCTS, INC., Vergennes, VT (US)

( * ) Notice: Subject to any disclaimer, the term of this patent is extended or adjusted under 35 U.S.C. 154(b) by 159 days.

(21) Appl. No.: 14/154,425

(22) Filed: Jan. 14, 2014

(65) Prior Publication Data

US 2015/0198505 A1    Jul. 16, 2015

(51) Int. Cl.
  *G01M 13/00* (2006.01)
  *G01M 17/00* (2006.01)
  *B64C 27/00* (2006.01)
  *G05B 23/02* (2006.01)

(52) U.S. Cl.
  CPC ............. *G01M 17/00* (2013.01); *B64C 27/001* (2013.01); *G05B 23/0227* (2013.01)

(58) Field of Classification Search
  CPC ....... G01M 13/00; B64C 27/00; B64C 27/04; B64C 27/32
  USPC .............. 73/66, 112.01, 115.01, 115.05, 455, 73/460, 462
  See application file for complete search history.

(56) References Cited

U.S. PATENT DOCUMENTS

| | | | | |
|---|---|---|---|---|
| 4,465,367 A * | 8/1984 | Sabatier | ............................ | 356/23 |
| 4,524,620 A * | 6/1985 | Wright et al. | .................... | 73/587 |
| 5,163,011 A * | 11/1992 | Gunsallus | ........................ | 702/42 |
| 6,415,206 B1 * | 7/2002 | Ventres | .......................... | 700/280 |
| 7,136,794 B1 * | 11/2006 | Bechhoefer | ........................ | 703/7 |
| 2009/0216398 A1 * | 8/2009 | Lynch et al. | ..................... | 701/30 |
| 2012/0078544 A1 * | 3/2012 | Lynch et al. | ..................... | 702/56 |
| 2013/0119971 A1 | 5/2013 | Roederer et al. | | |
| 2015/0007666 A1 * | 1/2015 | Tucker et al. | .................... | 73/787 |
| 2015/0096370 A1 * | 4/2015 | Lin et al. | .......................... | 73/455 |
| 2015/0112637 A1 * | 4/2015 | Hiatt | .............................. | 702/182 |

OTHER PUBLICATIONS

Application No./Patent No. 15150856.1; European Search Report dated Oct. 6, 2015; 5 pages.

* cited by examiner

*Primary Examiner* — Eric S McCall

(57) ABSTRACT

The present disclosure relates to a method to determine, from a measured result and an assumed adjustment set, the probability that a permutation to the assumed adjustment set was implemented or other error, such as a sensor error, is occurring. The determination of probability of a permutation of the adjustment set may be based on the error between the predicted response and the measured actual response for the assumed adjustment set and permutations of the assumed adjustment set. A number of statistical comparisons may be performed between the assumed adjustment set and the permutation sets to determine which are closer to the measured actual response. A probability value may be assigned to each adjustment set as to the likelihood of their having been implemented.

16 Claims, 2 Drawing Sheets

SYSTEM AND METHOD FOR ADJUSTMENT RESPONSE ANALYSIS

FIELD

The present disclosure relates to identification and diagnosis of adjustment errors and/or system failures.

BACKGROUND

Various mechanical modifications may be made on equipment over time. This equipment may include sensors to help identify errors. Often times, the modification desired is not made on the first attempt. Moreover, at times, the modification may be an inadvertent over-correction or performed erroneously. At these times, it is difficult to solve the current problem and/or perform the current desired modification to the modified equipment.

SUMMARY

The present disclosure relates to a computer-based system configured to determine a proper process flow and/or assist with dynamic balancing. The system may include receiving actual adjustment results, such as after an adjustment has been performed. The system may include identifying permutations of available adjustments. The system may include determining the expected results for the available permutations of adjustments. The system may include determining an error rate measured from the actual adjustment results as compared with the expected results for the available permutations and identifying a likely actual adjustment performed based on a value of the error.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

Figure 1:
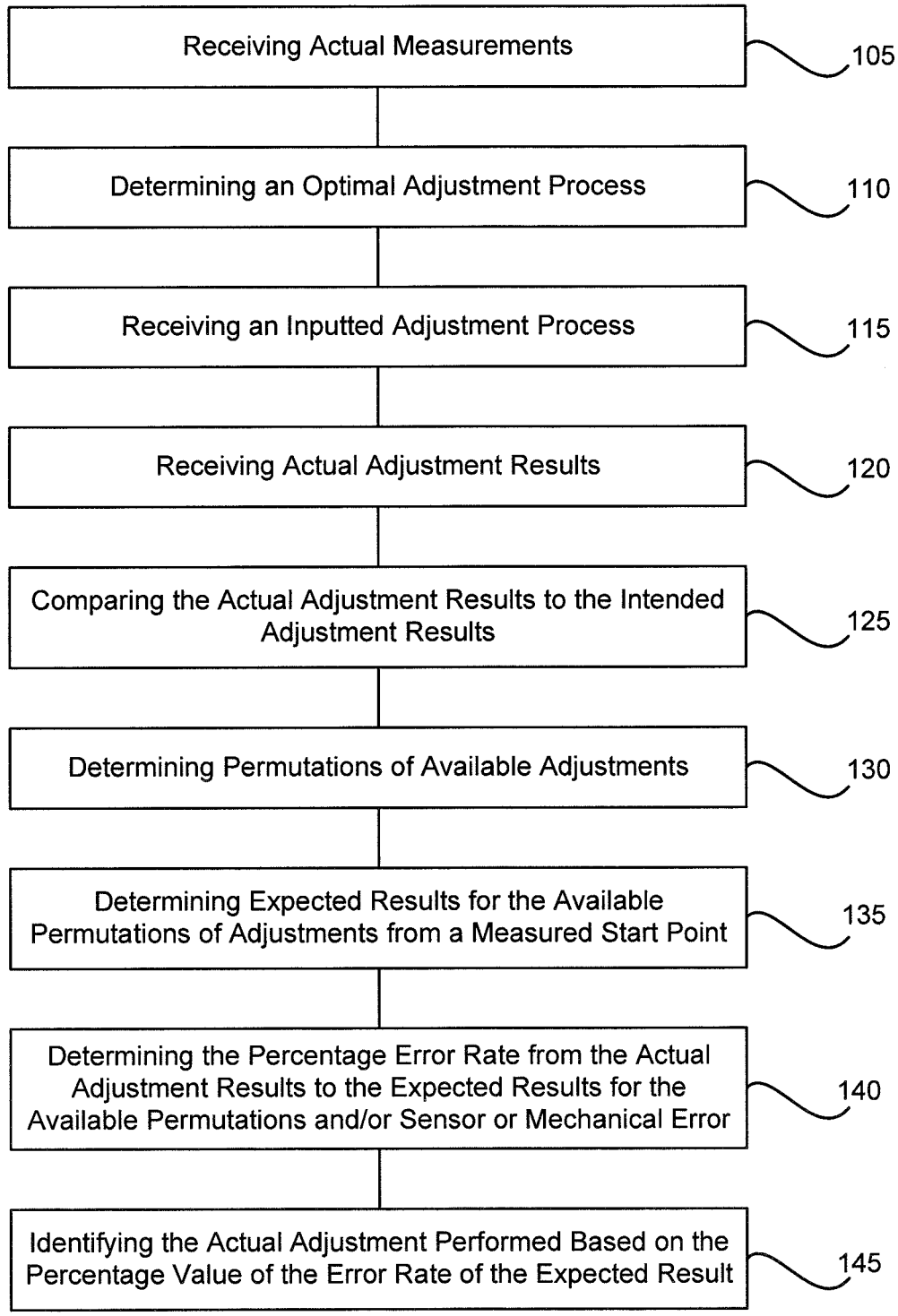
FIG. 1 depicts a process flow of a system described herein in accordance with various embodiments.

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step.

The present disclosure relates to a method to determine, from measured data set and an assumed adjustment set, the probability that a permutation to the assumed adjustment set was implemented. The determination of probability of a permutation of the adjustment set may be based on the error between the predicted response and the measured response for the assumed adjustment set and permutations of the assumed adjustment set. A number of statistical comparisons may be performed between the assumed adjustment set and the permutation sets to determine which are closer to the measured response. A probability value may be assigned to each adjustment set as to the likelihood of their having been implemented.

As a diagnostic tool, the adjustment response analysis can quickly determine the probability of a permutation to the assumed adjustment has been implemented. In the case of low probability for any adjustment set or permutation, one assumption may be that the element under inspection is not responding according to the adjustment response model and further maintenance investigation may be warranted prior to proceeding. There is no current capability to analyze the response to adjustments when the adjustment is not performed as expected/intended. Historically, the adjustment implementation record was investigated for error and a restart of the dynamic adjustment effort was performed. This restarting of the dynamic adjustment effort is not the best utilization of resources.

For instance, in the case of a helicopter rotor, improper adjustments usually manifest in uniform phase errors (90, 180, and 270 degrees, for example, in a 4 bladed rotor system) or opposite magnitude from the expected response. Sensor orientation errors can also present similar phase errors or opposite magnitude from the expected response symptoms. In contrast, mechanical faults generally are not as consistent of an error and typically result in more random magnitude and phase response errors. According to various embodiments, the present disclosure details the use of statistics applied to a solution expected versus the measured response to the given adjustment and a list of likely causes for a variance, which are presented to the user.

Rotor tuning processes involve a measurement of one or more vibrations on the aircraft. In response to the measured vibrations, a variety of various adjustments may be made to the different adjustment elements on the rotor head, in order to minimize those vibrations. There may be many permutations of mechanical adjustments available. For instance, in the case of a helicopter rotor, to solve a particular vibration issue, one may determine that weight should be added on two of the four blades and/or that a pitch control rod may need to be altered in a particular direction to change the pitch of two other blades. In addition, it may be determined that an adjustment to the trim tabs (generally located on the end of the blades, up or down on two of the four blades) is desired. These adjustments in combination may be determined as desirable to address a single vibration concern. Any one of these adjustments may be subject to errors in implementation. The present system and method may assist with the diagnosis of the error. Also, a sensor may provide an incorrect reading, either from being incorrectly installed or due to malfunction. The present system and method may assist with the diagnosis of sensor errors.

According to various embodiments, in response to performing an adjustment, a measurement and/or check that the vibrations were reduced as expected to within specified levels may be made. In response to the results not being within an acceptable and/or expected range, the present system may provide a prediction of what may have occurred. This may assist with the troubleshooting of the error and the solving of the original and current concern based on existing conditions.

According to various embodiments, based on (1) the initial measured vibrations, the determined intended adjustments, (2) the measured vibrations post adjustment, (or post intended adjustment), and (3) a prediction of results based on a properly executed adjustment, the system may return a listing of probable adjustments that were actually performed. Stated another way, in response to the prediction of properly executed adjustment not aligning with actual results, the system may deliver an indication of what may have occurred. Based on the present measured vibrations after an adjustment is performed and the predicted results based on permutations of available adjustments taking into account a known start point, a likely actual adjustment may be determined. For instance, in response to a predicted result of an available adjustment being closer aligned with an actual outcome as compared with the "properly executed" intended adjustment a determination of what adjustment was performed may be determined.

Stated another way, a determination may be made that a predicted correct adjustment is more closely aligned to the actual measured outcome or that a predicted permutation may be more closely aligned to the actual measured outcome. In response to the predicted correct adjustment being closer to the measured outcome relative to the available permutations of adjustments, then the adjustment was most likely performed correctly. If one of the permutations is closer to the measured outcome as compared with the predicted correct adjustment, then the adjustment performed was most likely the permutation rather than the intended adjustment.

Additionally, in the case where there is not a good association/match with any available permutations of adjustment (or properly executed intended adjustment), a determination that the equipment, such as aircraft, is not responding similar to the control model. This may be an indication of a mechanical concern rather than a mere adjustment error. In the alternative, in the case where there is not a good association/match with any available permutations of adjustment (or properly executed intended adjustment) a determination that a sensor is installed incorrectly or malfunctioning may be made. The system may provide a probability that a permutation of the intended adjustment was applied.

The system may be designed for single fault detection. According to various embodiments, based on computational power available, the system may perform and be designed for multi-fault analysis.

In operation, the system may receive and/or assemble actual measured data from the equipment under inspection (step 105). For instance, this data may be received prior to an adjustment being performed. The system may determine an optimal adjustment process to put the equipment under inspection in line with acceptable performance metrics (step 110). The system may receive an inputted adjustment process such as a selection of adjustments performed and/or attempted from the available permutations of adjustments, such as via a user interface (step 115). The system may receive and/or assemble actual adjustment results such as measured data from the equipment under inspection (step 120) after the equipment under inspection has undergone an adjustment. The system may diagnose the likely adjustment made based on a comparison of the actual adjustment results and the intended adjustment results (step 125). The system may determine permutations of adjustments available (step 130). The system may determine expected results for the available permutations of adjustments from a measured start point (step 135), such as the data received prior to making an adjustment.

The system may determine the percentage error rate from the actual adjustment results to the expected results for the available permutations (step 140). The system may also compute a likelihood of a sensor error (such as for an operating error with the sensor) and/or sensor reading error (such as for an installation issue with the sensor) (step 140). The system may also compute a likelihood of mechanical issue (step 140). The system may identify the actual adjustment performed based on the percentage value of the error rate of the expected result (step 145).

The system may display, via an interface such as a display interface, a listing of the most likely adjustment performed, such as via a percentage and/or the most likely reason for the measured results. This listing may include the intended adjustment and/or a series of potential adjustments. This listing may indicate a likelihood of which adjustment was performed, such as via a percentage likelihood. This percentage may be based on the deviation from the expected result for the adjustment to the actual measured result. For instance, a table of adjustments (including magnitude and direction information) with a slider that sequences through the possible permutations while highlighting the probability that each one occurred may be displayed to a user through an interface. A control table may be fashioned for each permutation based on prior obtained results and/or calculated results based on technical manuals and expected performance calculations.

In the case of a helicopter, the available adjustments for rotors such as to combat vibration, may include, adding or removing an amount of weight, balancing the blades, regulating the twist of a blade relative to airspeed, and/or tuning the pitch change rods. The pitch change rods may be configured to alter the effective angle of attack of any given blade to which they are associated. A tab or tab-like control may be configured to change the twist of the blade relative to airspeed, (such as by forming an aerodynamic change to that blade). Stated another way a variety of changes in weight, adjustments of pitch and cyclic changes/adjustments in pitch may be made to cure a vibration error. The order of magnitude, the direction of magnitude, and the location of the change may be inadvertently and/or improperly adjusted. The present system may determine the source and potentially a correction scheme to address these concerns. Data received may be actual flight test errors. The flight conditions and three dimensional path, and speed associated with these errors may be collected.

According to various embodiments, in response to a correct and/or intended adjustment being applied and the aircraft responding closely to the model, the predicted outcomes are a good match, (e.g., indicate that the adjustment was performed correctly as intended). In response to an incorrect adjustment being applied and the aircraft responding closely to the model, the predicted outcomes are a good match to the permutation of the adjustment. The error ratio for the permutation is compared to that of the recommended adjustment. The smaller permutation error indicates a candidate for a possible application error. In response to no predicted outcomes matching the aircraft response, an inference may be made that a mechanical defect has occurred or that a sensor error, (failure or installation concern) is present. The errors may be tabulated such that a report of common adjustment errors may be determined to be eliminated. A feedback loop may aggregate the results such that a listing of mostly likely adjustment errors may be tabulated. Data may be assembled by establishing a control group for every permutation of each available adjustment using measured results and/or calculated results.

Concepts of this disclosure may be applied to any system where adjustments are made based on a response model and specific responses are expected. This includes any type of dynamic balancing e.g. wheels, engines, shafts, etc.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more."

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments. Different cross-hatching is used throughout the figures to denote different parts but not necessarily to denote the same or different materials.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross-over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. As those skilled in the art will appreciate, user computer may include an operating system (e.g., Windows NT®, Windows 95/98/2000®, Windows XP®, Windows Vista®, Windows 7®, OS2, UNIX®, Linux®, Solaris®, MacOS, etc.) as well as various conventional support software and drivers typically associated with computers.

Figure 2:
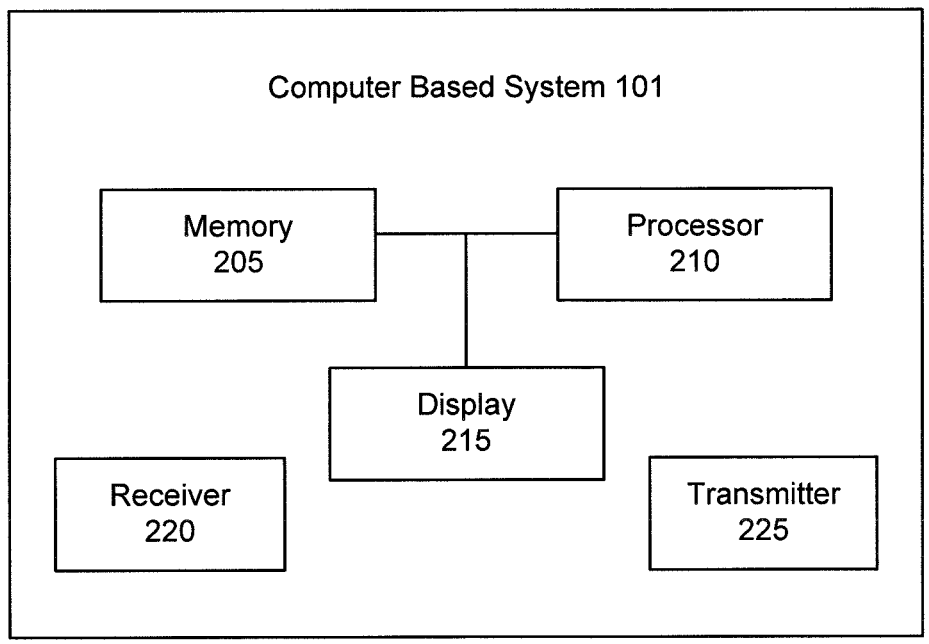
FIG. 2 depicts a high level computer system configured in accordance with various embodiments.

According to various embodiments and with reference to FIG. 2, the system described herein may be embodied in and/or on a computing device (e.g., processor 210) and an associated memory 205. For instance, method described herein may be embodied on a computer-based system 101 configured for the identification and diagnosis of adjustment errors and/or system failures. Memory 205 may comprise an article of manufacture including a tangible, non-transitory computer-readable storage medium having instructions stored thereon that, in response to execution by a computing device (e.g., processor 210), cause the computing device to perform various methods. The computer-based system 101 may be operatively coupled to a display 215. The computer-based system 101 may be operatively coupled to a receiver 220 and/or transmitter 225 for the transfer of data, such as over a network.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method comprising:

receiving, by a processor that is coupled to at least one of a sensor coupled to a helicopter or the helicopter and configured to determine effects to the helicopter of an actual adjustment that was made to a component of the helicopter, an actual adjustment result including measured data from the component after the actual adjustment has been performed;

determining, by the processor, a permutation of an available adjustment, the available adjustment including at least one potential adjustment that may be made to the component;

determining, by the processor, an expected result corresponding to expected effects to the helicopter for the permutation of the available adjustment from a measured start point corresponding to a point prior to the actual adjustment being performed;

determining, by the processor, an error measured from the actual adjustment result as compared with the expected result for the permutation of the available adjustment;

identifying, by the processor, the actual adjustment that was made to the component based on the error; and displaying, by a display, data identifying the actual adjustment that was made.

2. The method according to claim 1, further comprising receiving, by the processor, an inputted adjustment corresponding to an attempted adjustment to the component.

3. The method according to claim 2, further comprising comparing, by the processor, the actual adjustment result to an intended adjustment result corresponding to an adjustment result that would have occurred if the attempted adjustment were actually performed.

4. The method according to claim 1, further comprising receiving, by the processor, measurement data corresponding to measured data from the component prior to the actual adjustment being made.

5. The method according to claim 4, further comprising determining, by the processor, an optimal actual adjustment to be made in order to achieve a desired effect to the helicopter.

6. The method according to claim 4, further comprising determining, by the processor, an optimal actual adjustment to be made based on the actual pre-adjustment measurement data.

7. The method according to claim 1, wherein identifying the actual adjustment that was made comprises identifying at least one of a sensor operation error, a sensor installation error or a mechanical defect associated with the component.

8. The method according to claim 1, wherein the measured data corresponds to vibrations of a rotor of the helicopter.

9. The method according to claim 8, wherein the actual adjustment includes at least one of adding weight to a rotor blade of the rotor, removing weight from the rotor blade, balancing the rotor blade, regulating the twist of the rotor blade, or tuning the pitch of the rotor blade.

10. The method according to claim 1, further comprising:
   determining, by the processor, whether a rate of the error is less than an acceptable value; and
   determining, by the processor, that at least one of a sensor installation error occurred or a rotor of the helicopter has a mechanical defect in response to the rate of the error being less than the acceptable value.

11. The method according to claim 1, wherein the actual adjustment that was made corresponds to a dynamic balancing associated with at least one of a wheel, an engine, or a shaft of the helicopter.

12. A method comprising:
   receiving, by a processor that is coupled to at least one of a sensor coupled to a helicopter or the helicopter and configured to assist dynamic balancing of a rotor of the helicopter, helicopter rotor vibration data that corresponds to operation of the rotor after an actual adjustment has been made to the rotor;
   determining, by the processor, a permutation of an available rotor adjustment, the available rotor adjustment including at least one potential adjustment that can be made to the rotor;
   determining, by the processor, an expected result corresponding to expected effects to the rotor for the available rotor adjustment after the available rotor adjustment has been made;
   determining, by the processor, an error between the expected result of the adjustment and a measured actual result corresponding to the operation of the rotor after the actual adjustment has been made;
   identifying, by the processor, at least one potential adjustment that may have been made to the rotor based on the error; and
   displaying, by a display, the at least one potential adjustment that may have been made.

13. The method according to claim 12, further comprising receiving, by the computer-based system, an inputted adjustment corresponding to an attempted adjustment to the rotor.

14. The method according to claim 13, further comprising comparing, by the processor, the helicopter rotor vibration data to an intended adjustment result corresponding to potential helicopter rotor vibration data that would have occurred if the attempted adjustment had been made.

15. The method according to claim 12, further comprising receiving, by the processor, pre-adjustment helicopter rotor vibration data corresponding to measured vibration data prior to the actual adjustment being made.

16. The method according to claim 15, further comprising determining, by the processor, an optimal actual adjustment to be made that corresponds to the rotor based on the pre-adjustment helicopter rotor vibration data.

* * * * *